Jan. 12, 1932.    G. C. CHASE    1,841,170
CALCULATING MACHINE
Filed May 19, 1930    5 Sheets-Sheet 1

Inventor
Geo. C. Chase.
by E. W. Anderson Son
Attorneys

Jan. 12, 1932.  G. C. CHASE  1,841,170
CALCULATING MACHINE
Filed May 19, 1930   5 Sheets-Sheet 2
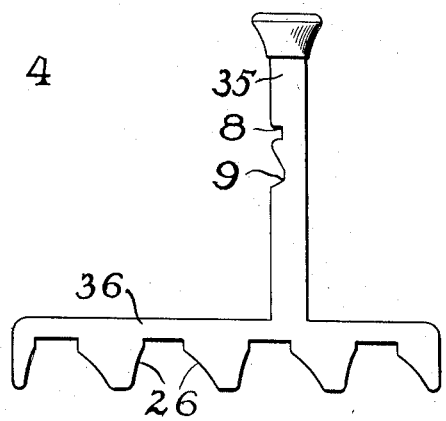
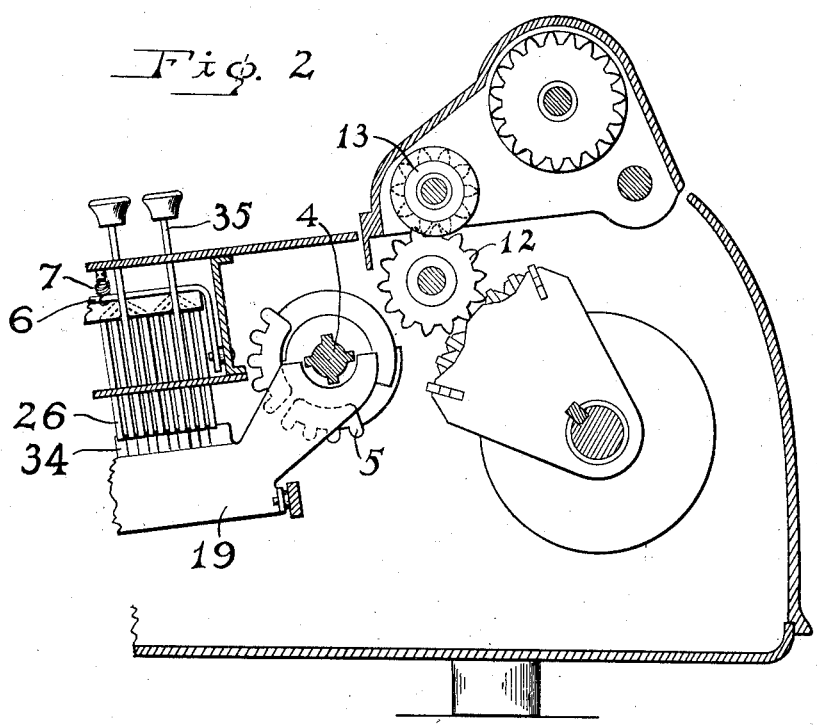

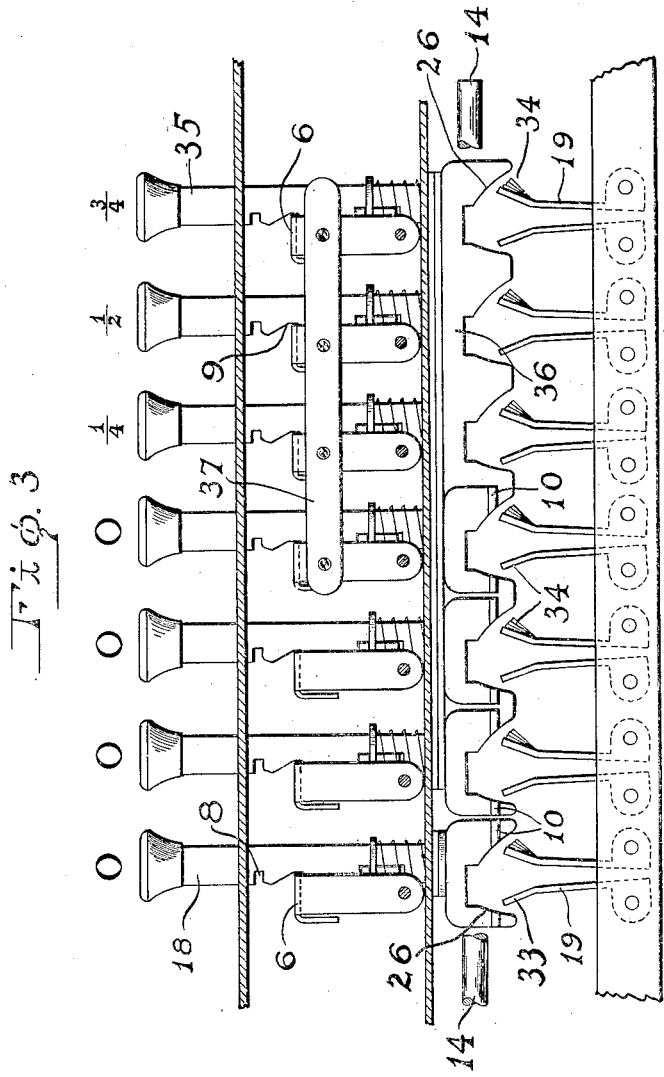

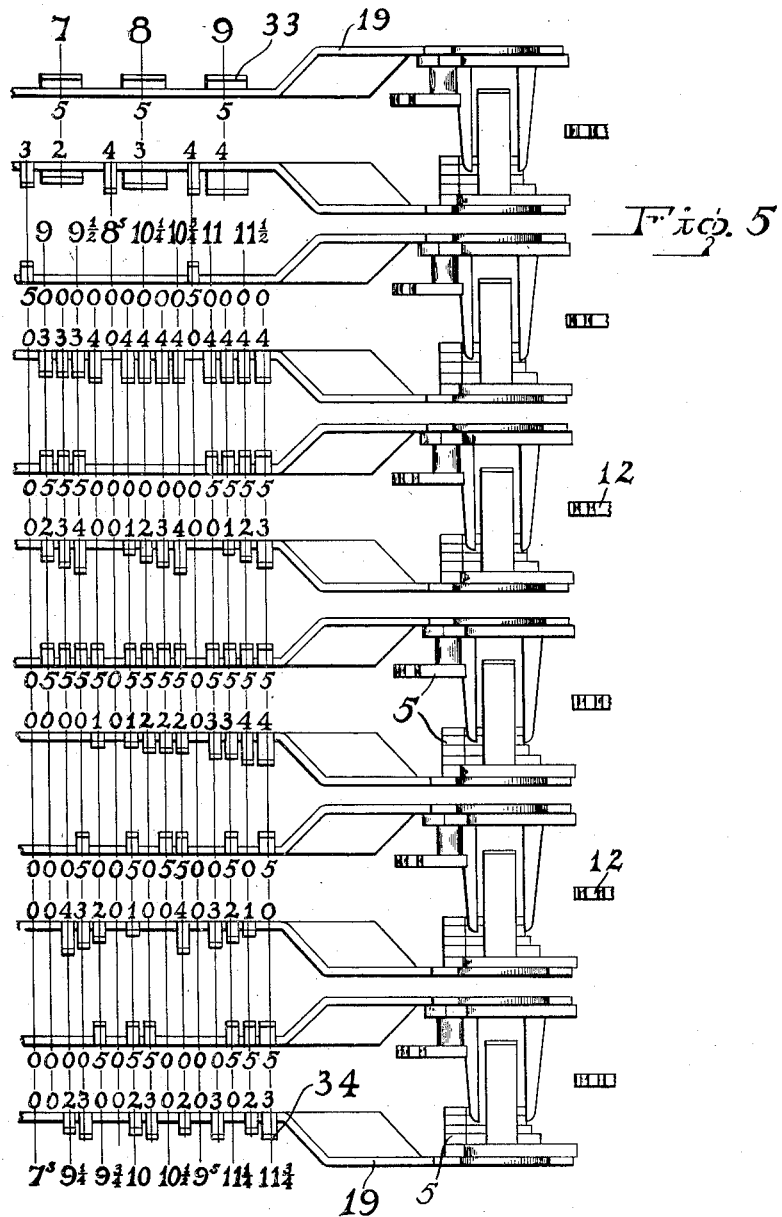

Patented Jan. 12, 1932

1,841,170

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed May 19, 1930, Serial No. 453,747, and in Great Britain June 19, 1929.

The invention relates to calculating machines, and more particularly to means for registering fractional values in their decimal equivalents, and it consists in the novel construction and combination of parts, as set forth in the appended claims.

The invention resides primarily in the provision of a row of fractional keys in alignment with each decimal equivalent order, each key cooperating with the selector devices to set up an amount in a plurality of ordinal places. Other features of the invention are hereinafter more particularly described and pointed out in the appended claims.

The invention is shown as applied to the well-known Monroe calculating machine, the principal features of which are exemplified in United States Reissue Patent Number 13,841, issued to F. S. Baldwin, and Number 1,566,650, issued to George C. Chase.

In the accompanying drawings illustrating the invention:

Fig. 2 is a right-hand side elevation of a portion of the selector mechanism and associated parts;

Fig. 3 is a front elevation of said mechanism;

Fig. 4 is a detail face view of a fractional key;

Fig. 5 is a fragmentary diagrammatic plan view of a group of selector bails and the gears related thereto;

Figure 1:
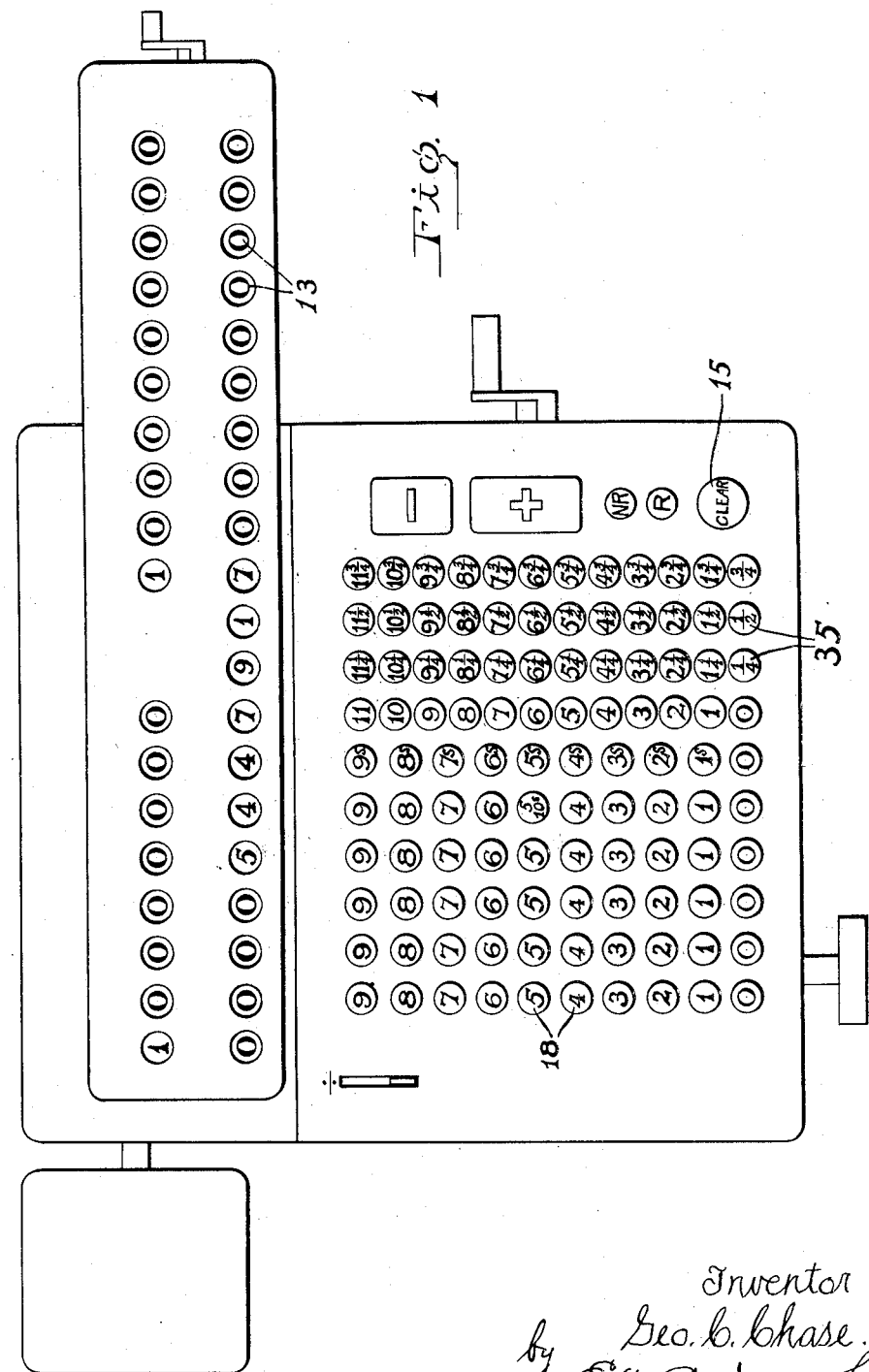
Figure 1 is a plan view of a calculating machine constructed in accordance with my invention.

Referring to the drawings, two-part selector gears 5 are mounted to rotate with a shaft 4, said gears having groups of gear teeth of varying lateral extent and the members of each gear pair being selectively positioned into the plane of gears 12, in driving connection with the numeral wheels 13 of the machine. The gear members 5 are positioned by selector bails 19, which may be considered as divided into groups, according to the denominator of the fraction which they represent.

As shown, the bails 19 located at the left-hand side of the machine are provided with lugs 33 offset from the plane of the bars to different extents, representing settings of the gear members 5 corresponding to the digits 1 to 9, in arithmetical progression. Similar lugs 34 are provided on the bails 19 located on the right-hand side of the machine, and are offset to represent, upon a group of said bails, progression according to the decimal equivalents of fractions of a given denomination.

The bails 19 are set and held in selected position by means of the decimal keys 18 and fractional keys 35, representing values according to the British currency system or according to other fractional systems involving several denominators. These keys have cam ends 26 adapted to operate pairs of bails 19 in accordance with the related lugs 33 or 34 lying in the plane of the particular cam ends 26. The cam surfaces of the ends 26 are all identical, the variation in the amount set being controlled by the difference in the angle of the lugs 33 and 34. The fractional keys 35 are provided with a plurality of cam portions 26 located upon offsets 36 of such keys overlying a plurality of columns of bails.

As used for calculations in British currency, the four left-hand columns of the keyboard illustrated in Fig. 1 are used for setting up pounds; the next two columns for setting up shillings, and the four right-hand columns for setting up pence and farthings. In the tens of shillings column, one key only is employed, namely the key marked "10S" in Fig. 1. The pence and farthings are designed to be set up by the depression of a single key, the right-hand keys showing mixed numbers, arranged in digitally progressive order from front to rear of the key columns, and in fractionally progressive order from left to right.

The shillings, pence, and farthings keys are designed to set up decimal equivalents, carried to six decimal places, and decimal equivalents set up in the tens of shillings, shillings, and pence-farthings columns are automatically added together upon the selector bails 19.

This adding of the decimal equivalents is possible because of the two-part arrangement of the selector bails 19 and gears 5. One member of these bails is operable to set up the digit 5, and the other member to set up the digits from one to four, and since the decimal equivalent of ten shillings is .5, and since the highest registration in the units of shillings column (nine shillings) has a decimal equivalent of .45, tens of shillings are registered on one of the bails in alignment with the tens of shillings key, and units of shillings are registered on the other bail related to said column.

Similarly, the units of shillings decimal equivalents require the registration in the second column of zero or of five, whereas the greatest pence registration (11¾ pence) is .048958, so that the five bail in the units of shillings column is utilized in registering shillings and the one to four bail in this column is utilized in registering pence.

When the machine illustrated in Fig. 1 is to be used in the calculation of decimal values only, the tens of shillings column is available for use with the other four columns to the left thereof. It will be noted that the tens of shillings key sets up .5, and that it is located in line with the decimal 5 keys, and, therefore, by the addition of keys representing one to four and six to nine, the selecting mechanism in this column will be precisely the same as in the four left-hand columns. The keys one to four and six to nine are not used, of course, in British currency calculations.

The above-described mechanism operates as follows:

It being desired to set up five pounds, eight shillings, eleven pence, halfpenny, the five-key in the seventh column is depressed to set up five pounds, as in any decimal machine. The eight-key in the units of shillings column is depressed to set up .4 in the column aligned with the tens of shillings key, and the eleven and a half key will be depressed to set up .047917 in the five right-hand fractional columns, as will be obvious from an inspection of Fig. 5. Subsequent rotation of shaft 4 will thus cause the operation of the proper numbers of gear teeth in the different columns to register the amount 5.447917, rotation of the shaft and registration of the amount being made either additively or subtractively.

Figure 6:
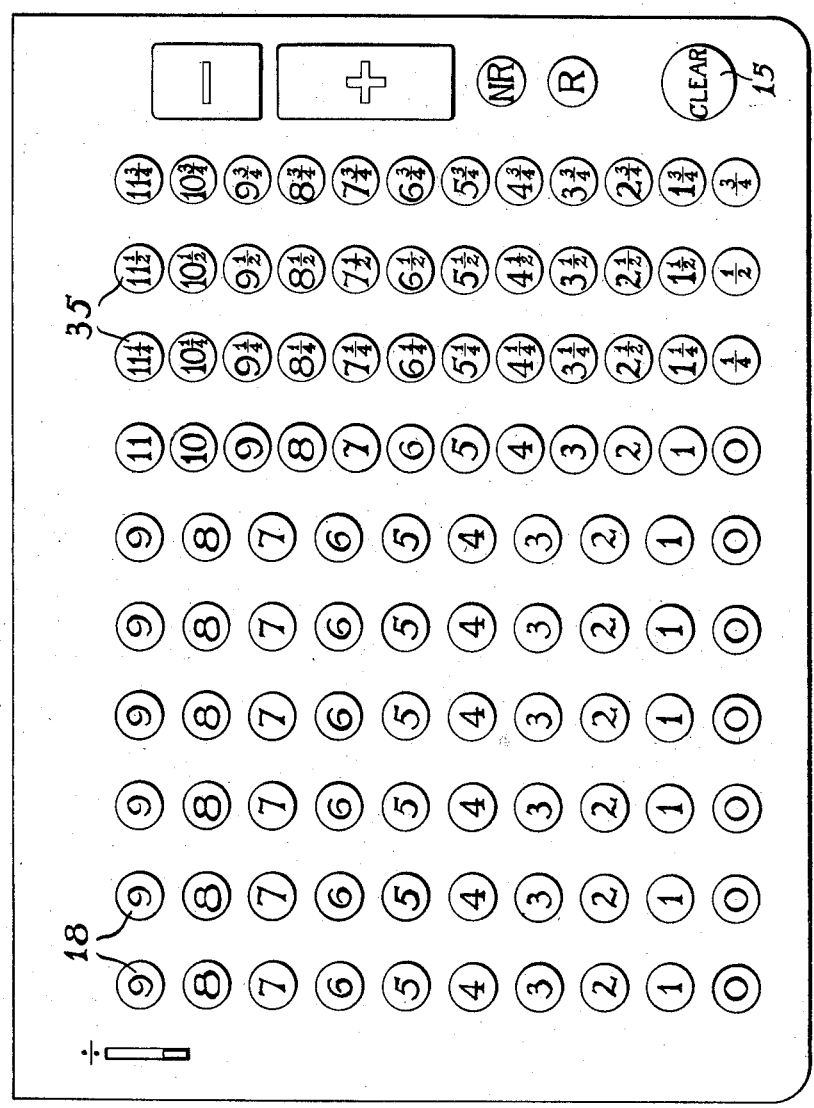
Fig. 6 is a plan view of a modified keyboard, designed for calculating in feet, inches and fractions of an inch.

Fig. 6 illustrates the invention in a modified form, useful in calculations in feet, inches and fractions of an inch. In this form the six left-hand, or decimal columns of keys, represent feet, and the four right-hand columns register inches and fractions of an inch, corresponding in general to the pence and farthings columns of the form of the invention illustrated in Fig. 1. The only distinction in the inches keys over the pence keys is that the denominator is changed and that the decimal equivalent is now carried to four places only, these changes being made entirely in the design of the lugs 33 and 34 of the bails 19. The keys representing a denominator of twentieths (shillings keys) are omitted from the feet and inches keyboard and replaced by decimal keys.

Each column of keys 18 and 35 is provided with a key-locking bail 6 (Figs. 2 and 3) pivoted at its ends in the frame of the machine and actuated by spring 7 to engage notches of the keystems. The stems of the keys numbered one to nine (or eleven) and "0", have upper and lower notches 8 and 9 (Fig. 4), the lower notch 9 being engaged by locking bail 6 when the keys are in raised position, and the upper notches 8 being engaged by the bail to hold the keys in depressed position. A suitable cam edge of the keystem acts during the depression of the respective key to cam the locking bail outwardly and thereby release any other depressed key of the same column. Each key is provided with the usual return spring.

The amounts represented by the four right-hand columns of keys being set by a single key depression, means are provided whereby the depression of a key in any of these four columns may release any other key previously set in such columns. This means comprises a link 37, connecting the four right-hand locking bails 6, whereby operation of any of these bails will operate the other three simultaneously.

A clear key 15 is provided, operable upon depression to depress all of the 0-keys simultaneously, for which purpose a universal bar 14 is arranged transversely of the keyboard, under which bar engage lower lugs 10 of the 0-keys. Universal bar 14 has an end extension (not shown) engaged by the shoulder of clear key 15.

The above-described arrangement of 0- and clear keys provides for the "splitting" of the keyboard between various columns, so that keys in the selected columns are rendered irresponsive to release by the clear key. Thus, when it is desired to set an item permanently in the keyboard, the clear key is held in depressed position while value keys in the selected columns are being set. Upon release of the clear key, all of the 0-keys will remain depressed, notwithstanding that value keys are also locked down in certain columns, and thus subsequent operation of the clear key will not release value keys set in this manner, since the zero keys are already depressed and locking bails will not be operated. Keys in other columns, set in the ordinary manner, will, of course, be released by said depression of the clear key.

Because of the link 37, simultaneous depression of a key 35 and of clear key 15 will result in locking the decimal equivalent in the right-hand columns of the machine.

The usual non-repeat mechanism is employed to clear the entire keyboard, said mechanism operating to release any value keys which have been rendered irresponsive to release by the clear key as above described.

I claim:

1. In a key set calculating machine having selector devices representing decimal equivalents of a given number of ordinal places and selector devices representing whole numbers; a row of mixed number keys in alignment with each decimal equivalent order, each key cooperating with said decimal equivalent and said whole number devices to set up an amount in a plurality of such ordinal places, said keys being arranged in digitally progressive longitudinal order and fractionally progressive transverse order.

2. In a key set calculating machine having column selecting devices, and a column of keys, each key adapted to set a decimal equivalent in a selector column; a second column of keys in which each key is adapted to add to such setting a second decimal equivalent including a setting in a column set up by a first named key.

3. In a key set calculating machine having column selecting devices comprising each a pair of cooperating members, and a column of keys, each key adapted to set a decimal equivalent in one of the selecting members of each pair in adjacent columns; a second column of keys in which each key is adapted to set a second decimal equivalent including a setting in the remaining member of a column set up by a first named key.

Signed at Orange, in the county of Essex and State of New Jersey, this 16th day of May, A. D. 1930.

GEORGE C. CHASE.